R. J. ALTGELT.
PLANTER.
APPLICATION FILED SEPT. 15, 1915.
1,205,960.
Patented Nov. 28, 1916.
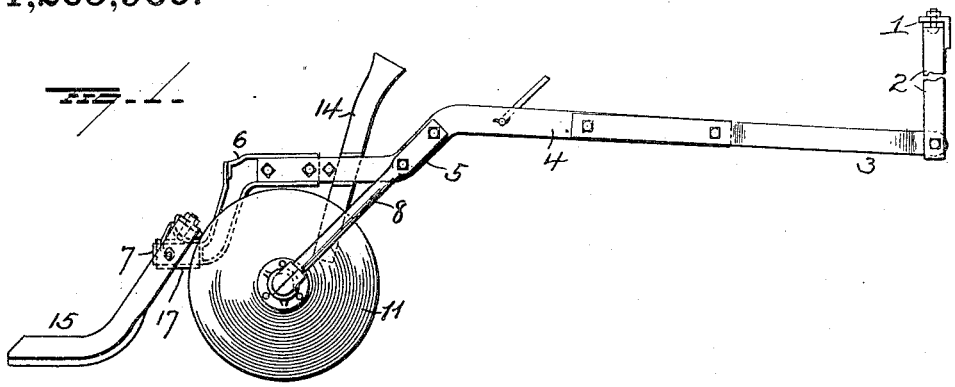
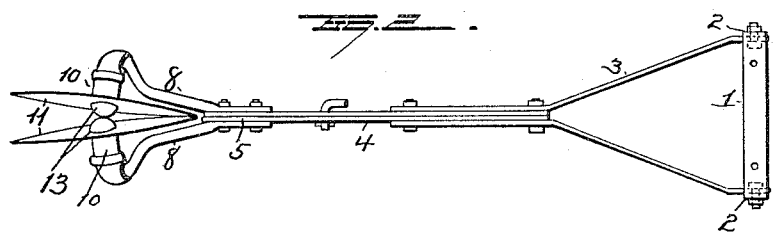
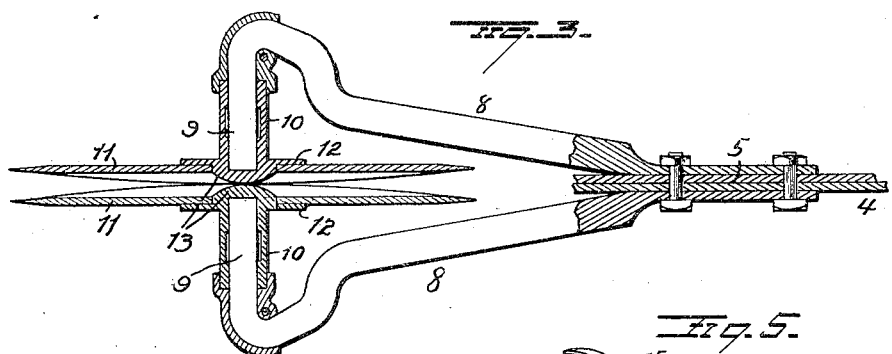
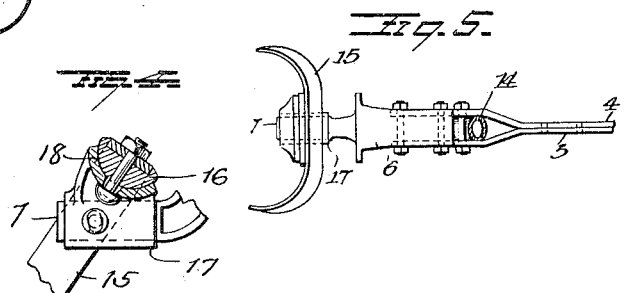
WITNESSES
E. J. Nottingham
G. F. Downing
INVENTOR
R. J. Altgelt
By H. A. Seymour, Attorney

UNITED STATES PATENT OFFICE.

RUDOLPH J. ALTGELT, OF SOUTH BEND, INDIANA, ASSIGNOR TO OLIVER CHILLED PLOW WORKS, OF SOUTH BEND, INDIANA.

PLANTER.

1,205,960.  Specification of Letters Patent.  Patented Nov. 28, 1916.

Original application filed February 26, 1915, Serial No. 10,788. Divided and this application filed September 15, 1915. Serial No. 50,836.

*To all whom it may concern:*

Be it known that I, RUDOLPH J. ALTGELT, a citizen of the United States, and a resident of South Bend, in the county of St. Joseph and State of Indiana, have invented certain new and useful Improvements in Planters; and I do hereby declare the following to be a full, clear, and exact description of the invention, such as will enable others skilled in the art to which it appertains to make and use the same.

This invention relates to improvements in planters,—the same being a division of application for patent filed by me on the 26th day of February 1915, and designated by Serial No. 10,788.

One object of my present invention is to provide disk furrow openers and seed covering means which shall be so mounted and relatively arranged that the dropping of the seed in front of the axes of the disks shall be fcilitated, whereby the choking of the seed tubes with dirt shall be obviated, and the deposit of the seed in the furrow before loose earth has had a chance to roll in between the disks, shall be insured.

A further object is to so mount double disk furrow openers that the disks will be prevented from coming closer together than may be desired.

A further object is to so mount double disks that the leading edges of the disks will remain close to each other regardless of the extent to which the bearings may become worn.

A further object is to mount the double disks in such manner as to allow the two disks to form a narrower wedge than is possible with other constructions of which I am aware, and thus leave just sufficient space to permit the seed to be dropped between them in front of their axles.

A further object is to provide improved means for mounting the covering blades.

With these and other objects in view, the invention consists in certain novel features of construction and combinations of parts as hereinafter set forth and pointed out in the claims.

In the accompanying drawings: Figure 1 is a side elevation illustrating my improvements; Fig. 2 is a plan view; Fig. 3 is a sectional view on a large scale; Fig. 4 is a detail view partly in section and partly in elevation, showing the mounting for the coverer blades, and Fig. 5 is a plan view showing the bifurcated portion of the beam and parts connected therewith.

1 represents a portion of the frame of a planter, from which hangers 2 depend and to the lower ends of these hangers, the members of a coupling fork 3 are pivotally connected,—said fork constituting coupling means for connecting a beam 4 with the pair of hangers.

The rear portion of each beam 4 is bent downwardly to form an inclined portion 5, and in rear of this inclined portion the beam is bifurcated and projects rearwardly so as to be disposed in a plane approximately parallel with that of the main forward portion of the beam. The beam may comprise two bars secured together and the rear bifurcated portion may be formed by spreading these bars apart.

Between the members of the bifurcated rear end of each beam 44, the forward portion of a bracket 6 is rigidly secured, said bracket projecting downwardly and rearwardly from its connection with the beam and is provided at its lower end with an approximately horizontal, rearwardly projecting journal 7 for a purpose hereinafter explained.

The upper forward ends of the inclined arms 8 of the respective pairs are rigidly secured to the diagonal portion 5 of each beam 4 at respective sides thereof. These arms may be made of resilient rods or bars and are normally spread laterally from their connection with the beam. At their lower ends, the arms 8 may be bowed laterally and then made to project inwardly to form approximately horizontal journals 9 for the hubs 10 of furrow opener disks 11, the journals 9 being so disposed relatively to each other that the disks will be disposed at such angle to each other to form a narrow wedge with the leading edges of the disks which form the apex of the wedge in close proximity to each other. The hubs 10 are provided with flanges 12 secured against the outer faces of the disks, and the inner ends of said hubs are made with rounded heads 13 which project through axial openings in the disks and bear against each other, being lightly pressed toward each other by the resilient action of the arms 8. With such construction, the disks will remain together in front, during the operation of the planter, no matter how much the bearings may become worn. In other words, the two disks will constantly press against each other at their front or leading edges as long as the planter is being moved forwardly, even though there may be considerable play in the bearings.

By mounting the disks as above described, the pair of disks may be set to form a narrow wedge, it being only necessary to afford sufficient space betwen them in advance of their axes to permit the dropping of seed. The seed spouts 14 are supported between the bifurcated rear portions of the beams 4 and are so disposed that they will depend between the disks of the respective pairs forwardly of their axes and thus discharge the seed forwardly of the axes of the disks so that said seed may be deposited into the narrow furrow before any loose earth has had a chance to roll between the disks. A further advantage of locating the discharge ends of the spouts 14 forwardly of the axes of the disks, is that they cannot become clogged with dirt which might be thrown upwardly by the revolving disks.

Pairs of covering blades 15 are provided in rear of the pairs of furrow opening disks. Each pair of blades may be made from a single strip of metal, to the horizontal intermediate or connecting portion of which, a curved or segmental block 16 is secured. A sleeve 17 is mounted on the journal 7 at the rear ends of the bracket 6, so as to have a limited rocking movement on said journal, and said sleeve is provided with an enlargement forming a curved seat 18 for the reception of the segmental block 16 and to which said block is adjustably secured so that the active portions of the covering blades may be adjusted vertically. By mounting the sleeves 17 so that they may have a limited rocking movement, the covering blades will be permitted to adapt themselves to the unevenness of the ground.

Having fully described my invention what I claim as new and desire to secure by Letters-Patent, is:—

1. In a planter, the combination with a frame and a beam attached thereto, of a pair of resilient arms secured to the beam and provided with inwardly projecting journals, furrow opener disks disposed between said arms and having central openings, hubs secured to the outside of said disks and mounted on said journals, said hubs having rounded heads projecting through the central openings of the disks and pressed against each other by said resilient arms.

2. In a planter, the combination with a frame, of a beam attached thereto, said beam having a rear inclined portion, inclined arms secured at their upper ends to said inclined portion of the beam and provided at their free ends with inwardly projecting journals, furrow opener disks disposed between said arms, and hubs secured to the outside of said disks and mounted on said journals.

3. In a planter, the combination with a frame, and a beam attached thereto, of a pair of arms secured to said beam forwardly of its rear end and provided with journals, furrow opener disks mounted on said journals, a bracket secured to the rear end of said beam, covering blades, and an adjustable mounting for said blades on said bracket.

4. In a planter, the combination with a frame and a beam attached thereto, said beam having a bifurcated rear end, of arms secured to said beam and provided with journals, furrow opener disks disposed between said arms and mounted on said journals, and a seed spout mounted in the bifurcated portion of the beam and adapted to discharge between said disks in front of their axes.

5. In a planter, the combination with a frame and a beam attached thereto and having a bifurcated rear end, of furrow opener disks, supporting means for said disks secured to the beam, a rearwardly and downwardly projecting bracket having its forward portion secured in the bifurcated rear end of the beam, said arm having a journal at its rear end, a sleeve mounted to rock on the journal of the bracket and provided with a curved bearing, a pair of connected covering blades, and a curved block secured to the connecting portion of said blades and adjustably secured on said curved bearing.

6. In a planter, the combination with a frame and a beam attached thereto and having a bifurcated rear end, of furrow opener disks, mountings for said disks connected with said beam, a bracket secured in the bifurcated rear end of the beam and projecting rearwardly therefrom, covering blades mounted on said bracket to rock, and means for adjusting said blades vertically on their connection with said bracket.

In testimony whereof, I have signed this specification in the presence of two subscribing witnesses.

RUDOLPH J. ALTGELT.

Witnesses:
VERA VAN DUSEN,
GERHARD BEHUK.

Copies of this patent may be obtained for five cents each, by addressing the "Commissioner of Patents, Washington, D. C."